Nov. 25, 1969  D. I. HOVEY  3,480,403

CHEMICAL ADDITION OF GAS TO LIQUID SOLVENT APPARATUS

Filed Sept. 19, 1966

INVENTOR
DANIEL I. HOVEY

BY *Fisher, Christen, Sabol & Caldwell*

ATTORNEYS

United States Patent Office 3,480,403
Patented Nov. 25, 1969

3,480,403
CHEMICAL ADDITION OF GAS TO LIQUID
SOLVENT APPARATUS
Daniel I. Hovey, Hillcrest, Niagara Falls, N.Y. 14303
Filed Sept. 19, 1966, Ser. No. 580,282
Int. Cl. B01j 7/02; C01b 31/20
U.S. Cl. 23—282                                    7 Claims

ABSTRACT OF THE DISCLOSURE

Apparatus for carbonating water without introducing the solid by-products of the chemical reaction producing the carbon dioxide. An openable cartridge includes a filter bag containing the solid chemicals for reaction. The cartridge material is impervious to the solvent, usually water into which it is immersed, but it does include an opening, closed by fritted glass, capable of passing the gas from the chemical reaction within the cartridge into the surrounding water but precluding water from passing therethrough; also, the bottom of the cartridge is apertured to permit water to enter the cartridge and pass into the filter bag to initiate the reaction. The cartridge further includes internal means for rupturing the bag, preferably near its top, to permit the carbon dioxide to escape via the fritted glass to the surrounding solvent.

---

The present invention relates to a novel apparatus for chemically adding a gas to a liquid solvent, while precluding the solid by-products of the chemical reaction from entering the solution.

The apparatus of this invention will be explained in particular with respect to the production of flavored and non-flavored carbonated beverages by the individual. This may be accomplished at home, using plain tap water for quickly producing carbonated beverages which may be then consumed or stored for later use. Since water is not usually added until the beverage is to be consumed, the storage problem related to prebottled carbonated beverages is obviated. In addition, the bottles need not be returned, sterilized, refilled and redelivered.

The equipment essential to the invention is quite compact and relatively simple, and thus, carbonated beverages can be made conveniently where there is available water.

A feature of the invention enables the production of the product without contamination by any of the solid by-products of the reaction, affording true flavor.

Basically, the invention provides for the reaction of two solid chemicals to produce carbon dioxide beneath the surface of water to be carbonized. A container and filtration system are employed which permit water to enter the container to bring about the reaction, and at the same time, prevent the solid by-products from escaping into the solution.

The container is in the form of a two-section cartridge or housing which may also include the stopper for the bottle. One section of the housing contains a filter paper bag which holds the dry mixture of carbonate ($CaCO_3$) and acid (citric acid), and the other section of the housing includes a device for penetrating the filter paper bag. The section of the container including the filter paper bag also includes openings for entry of water. When the sections of the container are moved relative to each other the filter bag is penetrated and then the container is placed into a bottle of flavored or unflavored water which is tightly stoppered by an extension of the container.

The upper section of the container is closed by means of a sintered or fritted glass disc which is water tight but gas pervious.

In operation, water enters the lower section of the container through the holes and passes through the filter paper bag to initiate the chemical reaction to produce the carbon dioxide. This gas escapes through the torn filter paper bag and passes through the fritted glass disc.

A further feature of the apparatus resides in the provision of space between the filter paper bag and the glass disc which enables adequate backpressure to build up as the gas is generated, which in turn prevents too rapid entry of water into the filter paper bag.

A predetermined amount of water is employed with a predetermined amount of chemicals and the reaction is timed to produce the desired degree of carbonation. The container is simply removed and the contents consumed or the bottle is restoppered.

It will be appreciated that the principle of the invention may also be applied to other ingredients, where liquid saturated with other gases are needed. By way of example calcium sulfide could be used in the container where a solution saturated with hydrogen sulfide is needed.

Thus, it is apparent that an important object of the invention is the provision of apparatus for the addition of a gas to a liquid by chemical means while precluding the solid-by-products of the chemical reaction from entering the solution.

It is a further object of the invention to provide apparatus for carbonating water without contamination.

Another object of the invention is the production of flavored carbonated beverages at low cost.

With the foregoing in mind, other and further objects will be appreciated from a reading of detailed description to follow, in conjunction with the drawing wherein.

Figure 1:
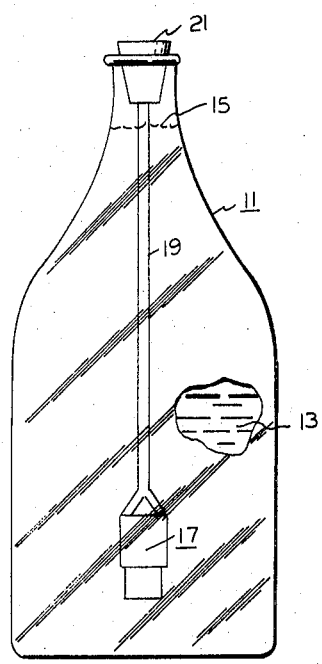
FIG. 1 is an elevational view showing the apparatus in operative position within a bottle.
Figure 3:
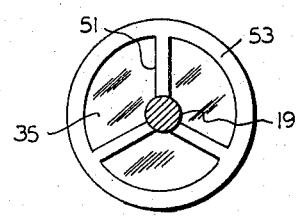
FIG. 3 is a view in top plan of the apparatus of FIG. 2.

In FIG. 1 there is depicted a bottle 11 filled with fluid 13 to a level 15. Cartridge 17 is supported by rod 19 connected to stopper 21.

The cartridge 17 is preferably comprised of cylindrical halves or sections 25 and 27. Male section 27 is threadably received by female section 25 in order that the puncture means shown as a nail or sharpened shaft 31, may penetrate the filter bag 33 when cylinder 27 is screwed into cylinder 25. The preferred material for bag 33 is Whatman filter paper type one or two (1 or 2) and the preferred material for cartridge 17 is stainless steel.

The shaft 31 is fixed in a sintered or fritted glass disc 35 which forms a closure for section 25 through flanges or gripping means 37. It is important to note that a space 41 is provided between the top of filter paper bag 33 and the glass frit 35. It is in this space 41 that backpressure develops to prevent water from entering the holes 43, in the bottom of section 27 of cartridge 17, too rapidly.

Figure 2:
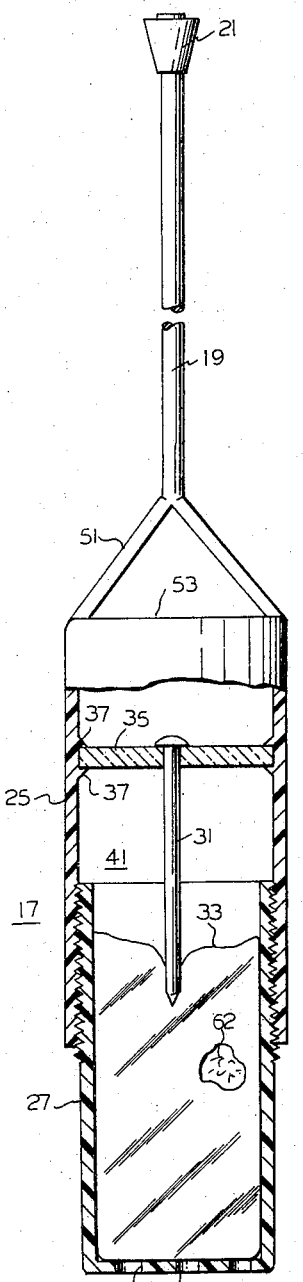
FIG. 2 is a view partly in side elevation and partly in cross-section showing the apparatus per se, of the subject invention.

The upper section 25 of cartridge 17 has affixed thereto a plurality of struts 51, attaching to rim 53 of cartridge section 25 at their lower ends and to vertical rod 19 at their upper ends. This rod includes stopper 21, adapted to fit bottle 11, and maintain it closed against the pressure of carbonation during the process of developing carbon dioxide, in the preferred embodiment. A mixture 62 of carbonate ($CaCO_3$) and citric acid is illustrated in FIG. 2. A typical amount of these reactants would be included sufficient to produce in, for example, one minute the requisite carbonation of the contents of a given size bottle, for example, one quart. In addition, it is preferred that the amount of insoluble $CaCO_3$ would be present in an excess (e.g., 1 and ⅓ times the stoichiometric) to avoid the escaping into the liquid of unreacted acid.

There is an excess of calcium carbonate because citric acid is very soluble and has a tendency to go into solution and flow through the filter paper of bag 33 into the water before it has had a chance to react with the calcium carbonate. Thus, the excess carbonate lessens the chances of any citric acid escaping.

It is also possible that some of the by-products, the calcium citrate, may form around some of the carbonate and prevent that part of the carbonate from reacting with the citric acid.

Therefore, it is seen that the excess assures that there will be enough carbonate to react, even if some of the carbonate is blocked out by the by-products.

Also, it is important that the apparatus allows for the slow entry of water at the bottom because if the reaction proceeds too quickly, some of the gas would be forced out of the holes 43 at the bottom of cartridge 27 and some of the citric acid would go with the gas and be dissolved in the water. Thus, it is a feature of the invention that the apparatus prevent the reactants and the by-products from entering into the water, in this manner.

It is interesting to observe that the puncture of bag 33 by nail 31 is necessary because the gas would not flow through the filter paper unless it were in solution; thus, without the puncture, pressure would build up within the bag until it finally became torn by excess pressure, but some of the gas would go out through the bottom and take with it some of the citric acid.

As other and further objects and embodiments of the invention will doubtless become apparent to those skilled in the art from a reading of the description herein presented, it is intended that the invention is limited only by the scope of the appended claims, wherein:

What is claimed is:

1. Chemical containing apparatus adapted to be immersed under a predetermined amount of solvent contained in a vessel to produce a chemical reaction of solid chemicals with said solvent comprising in combination, openable cartridge means; closed filtering means in said cartridge means for containing the solid chemicals for reaction with the solvent; said filtering means adapted to admit said solvent but preclude the passage of any solid reactants from said chemical reaction; said cartridge means being apertured in its lowermost region to admit solvent to the filtering means; said cartridge means comprising material impervious to passage of solvent therethrough such that the ingress of the solvent is confined to said apertures; said cartridge means further comprising an upper region having openings for the egress of the gas to the solvent; and means for penetrating said filtering means in the upper region thereof to permit gas from said reaction to pass therethrough into said solvent via said openings for gas.

2. The apparatus of claim 1 wherein said filtering means comprises a filter bag constructed of filter paper.

3. The apparatus of claim 1 wherein said cartridge means includes in the region of its uppermost portion a fritted glass material pervious to said gas but impervious to said solvent.

4. The apparatus of claim 1 wherein said cartridge means comprises a pair of containers adapted to be joined together in fluid-tight relation; one of said containers including said filtering means and the other of said containers having said penetrating means; said one of said containers having openings therethrough for admission of said solvent; and said containers comprising extension means for stoppering said vessel while enabling relative movement between said containers.

5. The apparatus of claim 1 wherein the solvent in water and the chemicals for reaction comprise calcium carbonate and citric acid.

6. The apparatus of claim 5 wherein the calcium carbonate is present in an excess of substantially one and one-half times the stoichiometric amount required to react with the citric acid to avoid the escape into the water of unreacted acid.

7. Apparatus adapted to contain solid chemicals for immersion in solvent contained in a vessel to effect a chemical reaction therewith comprising in combination, a pair of cylinders each having a first end and each threaded adjacent to its end opposite the first end for threadably engaging one with the other to comprise a housing; one of said cylinders being substantially closed at its first end; a fritted glass closure disposed in the other cylinder near its first end; a filter bag disposed within the housing to contain the chemicals; rod and stopper means connected to the housing for suspending the same in the solvent and stoppering the vessel; said filtering bag comprising a material pervious to the solvent but impervious to the solid reactants of the chemical reaction, whereby solvent entering the housing via its substantially closed end passes through the filter bag to initiate the reaction; said fritted glass closure characterized by being pervious to the gas and impervious to the solvent to permit gas egress from the housing; and puncturing means carried by the glass enclosure to pierce said bag in an upper region thereof when the cylinders are screwed together sufficiently.

References Cited

UNITED STATES PATENTS

| | | | |
|---|---|---|---|
| 19,960 | 4/1858 | Avery et al. | 99—275 |
| 20,382 | 5/1858 | Wheeler | 23—282 XR |
| 65,500 | 6/1867 | Needham | 99—275 |
| 437,318 | 9/1890 | Thackeray | 99—275 |
| 705,570 | 7/1902 | Feldkamp | 23—282 |
| 1,240,686 | 9/1917 | De Luca | 9—324 |
| 1,539,284 | 5/1925 | Thebaud | 23—282 |
| 1,905,986 | 4/1933 | Jacobs et al. | 99—275 |
| 2,334,211 | 11/1943 | Miller | 23—282 |

OTHER REFERENCES

| | | |
|---|---|---|
| 4,194 | 3/1886 | Great Britain. |
| 168,888 | 1/1923 | Great Britain. |

MORRIS O. WOLK, Primary Examiner

B. S. RICHMAN, Assistant Examiner

U.S. Cl. X.R.

9—321; 23—150; 99—275; 261—122